United States Patent [19]

Canevari et al.

[11] 4,258,543

[45] Mar. 31, 1981

[54] METAL CORD

[75] Inventors: Cesare Canevari; Luciano Tarantola, both of Milan, Italy

[73] Assignee: Industrie Pirelli S.p.A., Milan, Italy

[21] Appl. No.: 82,606

[22] Filed: Oct. 9, 1979

[30] Foreign Application Priority Data

Oct. 31, 1978 [IT] Italy .................. 29261 A/78

[51] Int. Cl.³ .................. D07B 1/06; D02G 3/48
[52] U.S. Cl. ...................... 57/212; 57/902; 152/359
[58] Field of Search .......... 57/210, 211, 212, 218, 57/902, 9; 152/359

[56] References Cited

U.S. PATENT DOCUMENTS

| | | | |
|---|---|---|---|
| 2,492,352 | 12/1949 | Bourdon | 57/902 X |
| 3,090,190 | 5/1963 | Boussu et al. | 57/902 X |
| 3,273,978 | 9/1966 | Paul | 57/212 X |
| 3,762,145 | 10/1973 | Kikuchi et al. | 57/218 |
| 3,911,662 | 10/1975 | Fenner | 57/211 |
| 4,158,946 | 6/1979 | Bourgois | 57/902 X |
| 4,166,355 | 9/1979 | Gross | 57/212 |

OTHER PUBLICATIONS

Research Disclosure No. 170, Jun. 1978, Industrial Opportunities Ltd., Hampshire UK.

*Primary Examiner*—Donald Watkins
*Attorney, Agent, or Firm*—Stevens, Davis, Miller & Mosher

[57] ABSTRACT

Metal cord, for reinforcing articles of an elastomeric material, such as tires, conveyor belts and so on of the single strand type, in particular made up of a plurality of 3, 4 or 5 wires, wherein the said wires are twisted together loosely, so as to result as being spaced apart from each other but in such a way that the ratio between the diameter of the circumference circumscribing the swollen cord and the diameter of the circumference circumscribing the corresponding compact cord, is comprised between 1.06 and 1.20. A thus realized cord consents for an optimum penetration of the elastomeric filler material but at the same time a tensile behavior, and in particular an elongation in the field of low values of loads applied, which does not differ in any appreciable way from that of the corresponding compact cord.

11 Claims, 3 Drawing Figures

METAL CORD

This invention refers to metal cords, and specifically to those used as reinforcement elements in articles of an elastomeric material, such as tires, conveyor belts, moving handrails, transmission belts, etc., for example.

In Tires, particularly radial tires and very large tires, these cords form the reinforcement elements of the casing and of the annular belt structure.

As is known, these cords are used by first of all making the so-called "metal cord fabric" consisting of a plurality of co-planar metal cords (warp wires) arranged parallel and adjacent to each other and embedded in a sheet of elastomeric material such as a rubber compound for example.

The piece of rubberised fabric made in this way is then cut to the corret angle and size in order to obtain fabric strips of pre-determined dimensions in which the reinforcement cords are arranged at an angle which is also pre-determined in relation to the longitudinal direction of the strip, e.g. 90° for the casing plies for radial tires.

It is also known that during the process of embedding the cords in the sheet of rubber, the elastomeric material adheres firmly to the external surface of the metal cords, thereby interlinking them as a replacement for the missing weft wires, but it does not succeed in penetrating inside them completely and the more complex the cord structure, the less this is the case, thereby leaving the inside of the wires bare, and empty spaces between each wire extending longitudinally along the axis of the cord.

This phenomenon is extremely harmful, particularly in certain articles such as tires or conveyor belts installed outside: in fact, generally speaking, moisture forms in these empty spaces, as a result of condensation of gases generated by the rubber. Moreover, in the case of the said articles water from outside can penetrate them directly as a result of the deterioration of the article with the subsequent formation of rust inside the cord.

Engineers are perfectly familiar with cracks in tire treads and in the bearing surface of conveyor belts, which penetrate down as far as the metal cords of the belt layers and of the resistant insert, exposing them to the chemical attack of the external agents and in particular of water, with all the subsequent serious damage.

In fact, this water does not remain localised in the area of entry, but by using the aforementioned empty spaces, it spreads along the cord causing it to rust with the subsequent decline in the mechanical strength quality, thereby rendering the article useless in a short time.

Up to now, many measures have been proposed to solve this problem including that of preventing the formation of rust by filling the empty spaces of the cord either in its formation stage or when the fabric is rubberised or by means of both processes, by using suitable synthetic, elastomeric or plastomeric materials.

However, none of the said measures have provided a completely satisfactory solution to the problem: in particular, of those mentioned, in the first case the introduction of the protective material during the formation of the cord considerably complicates its construction with subsequent economic problems.

In the second case, so that the introduction of the protective material between the cord can take place during the process of rubberising the fabric, the utilisable cord, according to the normal teaching of the engineers, must be of an elastic type, or better still "loose" (unlike the normal cords of the "compact" type), i.e. with the strands and wires well separated from each other so that the elastomeric material for rubberising the fabric can penetrate the cord completely, thereby ensuring that each wire is properly coated and that all the empty spaces are filled.

However, when subjected to load, particularly tensile loads, cords of this type show a substantial change in behaviour compared with compact cords, as shown by the load/deformation graph, and this is because of their particular structure which allows them to be penetrated completely by the fabric rubberising material.

In other words, the modulus of elasticity and the elongation at rupture of these cords are quite different from those of the compact cords, with high elongation values in the zone of the low load values.

Behaviour such as that just described has led to such cords being defined as elastic, and if, perhaps, this may constitute an advantageous and therefore sought-after characteristic, much more often, particularly in the tyre industry, it represents a negative and undesirable element.

The objective of this invention is to obtain a metal cord which allows itself to be penetrated completely by the elastomeric material in which it is inserted, but which maintains the values of the modulus of elasticity, of the elongation at rupture and of the breaking load substantially unaltered and similar to those of the usual compact cords.

Therefore, the subject of this patent is a metal cord, of a single strand type, especially for the reinforcement of articles of elastomeric material, consisting of a plurality of steel wires, individually twisted and wound together helicoidally, according to a swollen geometric configuration, having a larger diameter than the diameter of the same cord in a compact geometric configuration, characterised by the fact that the ratio between these diameters is contained between 1.06 and 1.20.

Based on the fact that in the following part of this text, the diameter of the swollen/compact cord is always the diameter of the circumference circumscribing the corresponding cord, the said ratio between the diameters can also be expressed quite conveniently as the ratio between the diameter of the swollen cord and the diameter of the individual constituent wires, the value of which, however, varies according to the number of wires making up the cord.

According to some advantageous embodiments, using individual wires having a diameter contained between 0.12 and 0.30 mm, the number of the said wires can be 3, 4 or 5, the ratio between the diameter of the swollen cord and that of the constituent wire thereby varying between 2.283 and 2.585, between 2.559 and 2.897, and between 2.863 and 3.241, respectively.

Cords made in this way have a modulus of elasticity which varies between 105 and 160 $KN/mm^2$, and elongation at rupture varying between 2.9 and 3.4% and a specific breaking load of approximately 2,700 $N/mm^2$, therefore substantially of the same order as those of the corresponding compact cords.

Very conveniently, such cords are produced by permanently deforming the elementary individual wires by bending them during the cording operation according to a radius of curvature which is less than that necessary to maintain the said threads helicoidally wound together in reciprocal contact in the geometric configuration of the corresponding compact cords of equal winding pitch.

In any case, the present invention will now be more clearly described with the aid of the following description and enclosed diagrams, given purely as an example and therefore not limitative, where:

FIG. 1 illustrates the straight cross section, i.e. the section taken with a plane perpendicular to the axis, of a 1×5×0.25 swollen cord in accordance with the invention.

We would mention that the definition of the type a×b×c like the 1×5×0.25 now used indicates the constituent elements of a cord, in particular of metal, i.e. the number "a" of strands, the number "b" of individual wires in each strand and the diameter "c", in millimeters, of the individual wire.

Figure 1:
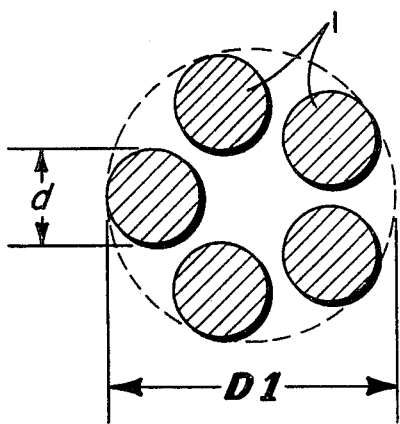
FIG. 1 illustrates a straight cross section of the 1×5 version of the cord in accordance with the invention.

Therefore, the cord illustrated in FIG. 1, is made up of a single strand formed by five steel wires, each with a diameter "d" of 0.25 mm.

These wires, indicated in the drawing by 1, are twisted individually and wound helicoidally together, but not so tightly that each one is in reciprocal contact with the wires immediately adjacent.

The straight cross section of the said cord is inscribed in a circumference of diameter "D1".

This diameter is assumed as the "diameter of the swollen cord".

Figure 2:
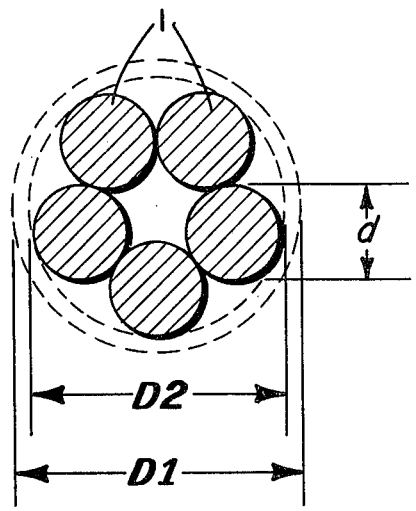
FIG. 2 illustrates a straight cross section of the 1×5 cord in the compact configuration in accordance with the state of the Art.

FIG. 2 illustrates the straight cross section of another cord, still 1×5×0.25, but of the type well known to engineers and which we define as compact because of the characteristic of reciprocal contact between the adjacent wires.

In this latter cord, the diameter of the circumference circumscribing the straight cross section has the minimum possible value in relation to the diameter of the constituent wires and is indicated by "D2": this diameter is assumed as the "diameter of the compact cord".

Turning now to the cord in accordance with the invention, (FIG. 1), because of the slight reciprocal space between the adjacent wires, the diameter D1 is greater than the diameter D2. In accordance with the invention, the value of the ratio D1/D2 varies between 1.06 and 1.20.

Having established this range of values for the ratio D1/D2, it is evident that a range of values of the ratio D1/d also corresponds to it, and in a biunivocal manner: however, having established a value D1/D2, the value of the corresponding ratio D/1d depends on the number of wires constituting the cord, as appears clear when it is considered that the value D1/d is obtained from D1/D2 on the basis of well-known mathematical and geometrical rules, by expressing D2 as a function of d which also depends on the number of wires making up the cord.

Having established the said range of values for D1/D2, the applicant has found that the best results are obtained with cords made up of three, four or five wires, all having the same diameter, preferably between 0.12 and 0.30 mm, to which values of the ratio D1/d, varying between 2.283 and 2.585 for the 1×3, between 2.559 and 2.897 for the 1×4 and between 2.863 and 3.241 for the 1×5, correspond respectively.

Very surprisingly, and contrary to the general opinion of the engineers, who have always thought that such a range of values for the ratio D1/D2 was too low to ensure good penetration of the rubber between the wires of the strand, the cords in accordance with the invention prove to have the advantageous characteristic of allowing complete penetration of the rubber, at the same time maintaining a substantially unaltered behaviour when subjected to tensile load, compared with compact cords in accordance with the state of the Art.

Figure 3:
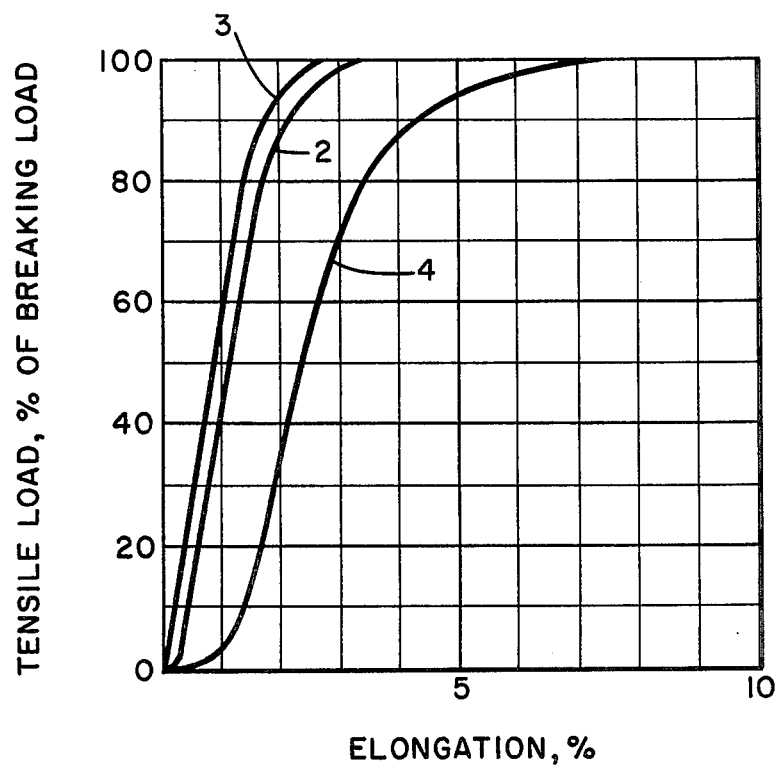
FIG. 3 illustrates the load/deformation graph to scale for three different types of cords, including that in accordance with the invention.

The load/deformation graph in FIG. 3 illustrates the behaviour—more from a qualitative than a quantitative point of view—of three different types of cord, including that in accordance with the invention.

As is known, the graph given consists of two axes, at right angles to each other, on which the values for the tensile load and for the elongation are marked according to a suitable scale.

In the said graph, the behaviour of any cord is represented graphically by a continuous line, each point of which measures the tensile load to which the cord has been subjected and the corresponding elongation suffered on the scale of axes.

In the present case, in view of the different values of the specific breaking load of the relevant cords, it was considered suitable to use the scales of the percentage values.

The graph in FIG. 3 illustrates the behaviour of a cord 1×5×0.25 in accordance with the invention (curve 2), of the corresponding compact cords 1×5×0.25 (curve 3) and of a common cord of an elastic type which allows good penetration of the rubber, like the 3×7×0.20 HE (curve 4).

On examining first of all the behavior of the 3×7×0.20 HE, it was found that the above statements were confirmed: in the case of low applied load values, the cord suffers considerable elongation. Therefore, its extensibility increases considerably in relation to the modulus of elasticity and increases again in the proximity of the maximum applicable load. The overall result is a 7% elongation for a load equal to 100% of the breaking load, equivalent to 1370 Newton.

Quite differently from this, the 1×5×0.25 compact cord (curve 3) has a modulus of elasticity which is substantially constant over the whole range of values and which is considerably higher, and therefore a considerably lower extensibility compared with the elastic cord: an elongation of 2.6% corresponds to the value 100% breaking load, 665 Newton.

The behaviour of the cord in accordance with the invention (curve 2) is very near to that of the corresponding compact cord (3).

This fact, which is surprising considering that any swollen cord, subjected to tension, first of all loses its "swelling", thereby transforming it to the compact configuration, is explained by assuming that for such a low swelling coefficient, i.e. for a value of the ratio between the diameters D1 and D2 within the range of values specified (in the case of the 1×5×0.25 in FIG. 1 it is approximately 1.14) the behaviour of the cord in accordance with the invention remains substantially unchanged compared with that of the corresponding compact cord. This behaviour illustrates an initially marked, yet barely perceptible, extensibility and therefore an extensibility which is only slightly and progressively greater than that of the compact cord, so that in the range of the values relating to the loads effectively applied to the cords in operation, and therefore considerably removed from the values of the breaking load, the behaviour of the two cords is more or less identical (curves 2 and 3 substantially close and parallel to each other).

Finally, at the value 100% breaking load, equal to 665 N, cord 2 suffers an elongation equal to 3.3%.

We have already said that—very surprisingly, and contrary to the general expectations of the engineers—cords having a swelling coefficient of such a modest value, contained within the range of values specified, have however proved that they allow optimum penetration of the elastomeric filler material.

In order to prove that this statement is true and not a coincidence, the applicant has developed a special test for evaluating the said extremely important parameter.

Therefore, several strips of metal cord fabric was prepared, each 400×100 mm size, reinforced with 1×5×0.25 compact cords and 1×5×0.25 swollen cords ($D_1/D_2 = 1.06$), respectively, rubberised with a compound based on elastomers which are either natural or which are compatible with natural rubber, with a high content of carbon black and a hardness exceeding 70° Shore A, and the vulcanised.

Each strip, defined as the test piece, was arranged with the cords arranged in a vertical direction, according to the larger dimension of the test piece.

The upper end of the said test pieces was placed in connection with a tank of water so that the test piece formed a type of drainage plug, the only possible flow path for the liquid being constituted by the metal cords of the test piece.

A device to collect and measure the liquid flow was placed beneath the said test pieces.

After waiting ten hours, it is possible to ascertain that 80% of the 1×5×0.25 compact cords allow the flow of water while the 1×5 swollen cords in accordance with the invention do not allow any flow, which demonstrates the optimum degree of filling of the cords themselves, equal to that achieved with the usual elastic cords.

Finally, it is worth pointing out here that the cords in accordance with the invention can be prepared very simply and conveniently on the normal double torsion machines, by bending the individual wires which make the cord by means of a suitable pre-forming device, according to a radius of curvature, the value of which is less than that required to keep the said wires helicoidally wound together in the corresponding compact cord of equal pitch.

It is known that in a metal cord, the axial development of the wires, their angle of torsion and also the radius of curvature and the pitch of the cord are interdependent values which are imposed by adjusting the characteristic diameters of the cording process by regulating the equipment (speed of rotatation of cording machine, feed speed of cord, diameter of pre-forming pin).

Therefore, by adjusting the pre-forming device, it is possible to vary the radius of curvature of the deformation by bending of the wires as required and therefore the degree of swelling of the cord in accordance with the invention.

It is understood that the present description is given purely as an example and is therefore not limitative and that the scope of the present patent also includes all those modifications and variations which are not expressly described but are easily accessible to any engineer in this field from the present inventive idea.

What is claimed is:

1. Cord of the single strand type adapted for the reinforcement of articles of elastomeric material, consisting of 3 to 5 steel wires, individually twisted and helicoidally wound together into a swollen geometric configuration, having a diameter greater than the diameter of the same cord in the compact geometric configuration, characterized by the fact that the ratio between the said diameters is between 1.06 and 1.20.

2. The metal cord of claim 1, characterised by the fact that the diameter of the individual constituent wires varies between 0.12 and 0.30 mm.

3. Metal cord of claim 1, characterised by an elongation at rupture not exceeding 4%.

4. Metal cord in accordance with claim 3, characterised by an elongation at rupture contained between 2.9 and 3.4%.

5. Metal cord in accordance with claim 1, characterised by the fact that the individual constituent wires are deformed by bending according to a radius of curvature of a value which is lower than the value required to maintain the said wires helicoidally wound together in the corresponding compact geometric configuration.

6. An elastomeric article reinforced with a cable comprising a plurality of helically wound steel wires with spaces between the wires to provide a cross-section of the cable which is between 1.06 and 1.2 times the cross-section of similarly helically wound wires in which their surfaces are contacting each other.

7. The elastomeric article of claim 6 which is a pneumatic tire for a motor vehicle.

8. A coreless multistrand cord of steel wires adapted to reinforce an elastomeric aricle, said steel wires being twisted together and loosely helically wound to form a strand having a cross-section which is 1.06 to 1.2 times the cross-section of a similar strand in which the wires are twisted compactly together.

9. Metal cord with three wires, in accordance with claim 8, characterised by the fact that the ratio between the diameter of the cord and the diameter of the individual constituent wires is contained between 2.283 and 2.585.

10. Metal cord with four wires, in accordance with claim 8, characterised by the act that the ratio between the diameter of the cord and the diameter of the individual constituent wires is contained between 2.559 and 2.897.

11. Metal cord with five wires, in accordance with claim 8, characterised by the fact that the ratio between the diameter of the cord and the diameter of the individual constituent wires is contained between 2.863 and 3.241.

* * * * *